US006925967B1

(12) United States Patent
    Woodruff

(10) Patent No.: US 6,925,967 B1
(45) Date of Patent: Aug. 9, 2005

(54) ILLUMINATED RETRACTABLE LEASH

(76) Inventor: Michele L. Woodruff, 61 E. Broad St., Titusville, FL (US) 32796

( * ) Notice: Subject to any disclaimer, the term of this patent is extended or adjusted under 35 U.S.C. 154(b) by 0 days.

(21) Appl. No.: 10/772,367

(22) Filed: Feb. 6, 2004

(51) Int. Cl.$^7$ .............................................. A62B 35/00
(52) U.S. Cl. ...................... 119/859; 119/796; 119/712; 119/776; 119/795; 119/797; 119/789
(58) Field of Search ........................ 119/859, 796, 712, 119/776, 684, 793, 795, 797, 789, 794

(56) References Cited

U.S. PATENT DOCUMENTS

| | | | |
|---|---|---|---|
| 3,123,052 A * | 3/1964 | Marshall ...................... 119/789 |
| 4,513,692 A | 4/1985 | Kuhnsman et al. |
| 4,887,552 A | 12/1989 | Hayden |
| 4,895,110 A * | 1/1990 | LoCascio .................... 119/859 |
| 5,245,516 A * | 9/1993 | de Haas et al. ............. 362/108 |
| 5,426,792 A * | 6/1995 | Murasko ........................ 2/422 |
| 5,558,044 A | 9/1996 | Nasser, Jr. et al. |
| 5,850,807 A | 12/1998 | Keeler |
| 5,887,550 A | 3/1999 | Levine et al. |
| 5,890,456 A * | 4/1999 | Tancrede .................... 119/794 |
| 5,946,071 A * | 8/1999 | Feldman ........................ 351/41 |
| 5,950,571 A * | 9/1999 | Schade ........................ 119/859 |
| 5,967,095 A * | 10/1999 | Greves ........................ 119/795 |
| 6,085,698 A * | 7/2000 | Klein .......................... 119/859 |
| 2002/0011219 A1 * | 1/2002 | Chien ......................... 119/859 |
| 2003/0029368 A1 | 2/2003 | Walter et al. |
| 2003/0145803 A1 | 8/2003 | Muller |
| 2004/0084271 A1 * | 5/2004 | Woodruff ............... 191/12.2 R |

FOREIGN PATENT DOCUMENTS

| | | | | |
|---|---|---|---|---|
| EP | 000464725 A1 * | 1/1992 | .......... A01K 27/00 |
| WO | WO 00/13750 | * | 3/2000 | ............ A62B 3/00 |

* cited by examiner

Primary Examiner—Peter M. Poon
Assistant Examiner—Andrea M. Valenti
(74) Attorney, Agent, or Firm—Richard C. Litman

(57) ABSTRACT

The illuminated retractable leash is an animal tethering device which uses electroluminescent wire and a DC to AC inverter to illuminate not only the extendable and retractable physical tether to the animal, but also to illuminate the leash housing. Electroluminescent wire wound on a rotating spool is supplied power by an inverter circuit powered by an on board battery. A transparent spool and an at least partially transparent housing provides the capability for illuminating the housing, as well as the electroluminescent wire leash.

5 Claims, 8 Drawing Sheets

ILLUMINATED RETRACTABLE LEASH

BACKGROUND OF THE INVENTION

1. Field of the Invention

The present invention relates to pet leashes, and more particularly to an illuminated, retractable pet leash.

2. Description of the Related Art

Retractable leashes for pets are well known. U.S. Patent Publication No. 2003/0029388, published in February 2003, and U.S. Patent Publication No. 2003/0145803, published in August 2003, both disclose a housing having a spring-biased spooling assembly for automatically taking up the slack in the leash. Similarly, illuminated pet leashes have also been available for several years. Not only do they increase the safety of both the pet and the owner when walking at night, but also present an attractive ornamental appearance. In addition, retractable leashes that extend the length of the leash and then retract, taking up the slack as the length is shortened, have also been available.

U.S. Pat. No. 5,967,095, issued to K. Greeves in October 1999, discloses a leash having a relatively flat and flexible light source provided along one side of the leash for illuminating the leash. The leash is a strap made from leather, plastic, nylon, or other similar material. The light source is preferably at least one strip of electroluminescent material attached to one or both sides of the strap by C-clips, hook and loop fasteners, etc., or is embedded into the strap. The electroluminescent material is powered by a battery and inverter, the power source being either permanently or temporarily attached to the strap. A second embodiment incorporates electroluminescent material to, illuminate the handle portion of a leash retractor, but does not incorporate means to illuminate the leash itself. Greves does not show or suggest a retractable illuminated leash, nor does Greves show or suggest that the leash may be made from electroluminescent wire itself, without a supporting strap of leather, plastic, nylon or the like.

U.S. Pat. No. 4,513,692, issued to Kuhnsman et al. in April 1985, discloses an illuminated pet leash comprising a non-opaque tube that contains one or more bundles of optical fibers. A light bulb is connected adjacent to the leash handle to shine light into the tube and illuminate the optical fibers in the tube.

U.S. Pat. No. 4,887,552, issued to James Hayden in December 1989, discloses an electrically lighted pet leash that is composed of a transparent, flexible tube containing a string of small electric light bulbs mounted in parallel between two insulated wires. The leash is looped at one end to form a choker collar and at a second end to form a handle. The string of lights extends throughout the leash to illuminate both the collar and the handle. A small rechargeable battery is mounted adjacent to the handle for operating the lights.

U.S. Pat. No. 5,850,807, issued to Russell Keeler in December 1998, discloses an illuminated leash for allowing a pet owner to easily and remotely locate the pet leash. The device includes an encoding/transmitting device for encoding and transmitting output signals, an elongated non-opaque tube having a bundle of optical fibers longitudinally disposed therein, a housing, a receiving/decoding device disposed within the housing for receiving and decoding the output signals from the transmitter and a light source disposed in the housing adjusted to illuminate the bundle of fibers.

The related art does not describe or suggest incorporating an illuminated, retractable leash within a leash retractor housing. Rather, the related art has been directed towards illuminated handles. In addition to the '095 patent heretofore discussed, U.S. Pat. No. 5,558,044, issued to Nassar, Jr. et al. in September 1996, discloses an illuminated dog leash handle and U.S. Pat. No. 5,887,550, issued to Anthony H. Levine, in May 1999, discloses a combined retractable pet leash and flashlight.

Although less relevant to the present invention, U.S. patent application Ser. No. 10/406,448, filed Apr. 4, 2003 by G. Woodruff, discloses a portable light spool system adapted to store and dispense electro-luminescent wire. The light system comprises a housing containing a rotatably mounted cylindrical hub around which the wire is wound. The cylindrical hub is hollow and is adapted to accommodate a battery and inverter. A switch disposed on the hub is operative to impress the high frequency A.C. output voltage of the inverter upon the electroluminescent wire.

None of the above inventions and patents, taken either singly or in combination, is seen to describe the instant invention as claimed. Thus an illuminated leash retractor solving the aforementioned problems is desired.

SUMMARY OF THE INVENTION

The illuminated retractable leash is a roll of electroluminescent wire mounted on a retractable reel in a handheld housing, the wire being attachable to a pet collar. Included in the housing is a battery, an inverter supplying power to the electroluminescent wire and a switch to illuminate the wire.

Electroluminescent (EL-wire) is a cool to the touch, bendable, vinyl coated wire that emits a pleasant 360-degree softly glowing neon light. EL-wire is a flexible wire cable having a solid copper center conductor surrounded by a material, which is luminescent in an electric field. Two thin filaments or wires, which are shorted together and helically wound around the luminescent material. The assembly is covered with one or two layers of vinyl or other plastic insulating material.

When an alternating current is conducted through the center conductor and the two filaments, the alternating electromagnetic field between the conductors causes the luminescent material to glow. The color emitted by the cable may vary with the frequency of the A.C. voltage or current. The brightness intensity level depends on the voltage and frequency applied to it, and usually must exceed a minimum threshold voltage before the EL-wire will glow. The higher the voltage and frequency, the brighter the EL-wire illuminates. The present invention utilizes a DC to AC inverter designed to generate a certain voltage and frequency, optimized for a specific length of EL-wire wound on the spool.

EL technology is relatively new and only within the past few years has EL-wire become available in consumer products, specifically applications requiring lengths of glowing lights, applications which previously employed LED or other lamp technologies.

The illuminated retractable leash has an at least partially transparent housing utilizing an extendible roll of EL-wire as the leash material wound around a rotatably supported spring-biased spool or reel. Not only is the EL-wire illuminated as it extends from the housing, but by virtue of the transparent spool and housing, the housing itself is illuminated, providing a further measure of nighttime safety.

The housing includes a spring-biased spool winding and unwinding mechanism commonly found in automatic leash retractors. A battery powered DC to AC inverter circuit is mounted on a printed circuit board disposed in the housing, the output of the circuit connected to the innermost end of the EL-wire. Operated by a housing mounted switch, the inverter provides the required electric signal to illuminate the entire length of the EL-wire. The spool is transparent, thereby allowing the EL-wire wound on the spool to illuminate the at least partially transparent leash housing.

Accordingly, it is a principal object of the invention to provide an illuminated, pet leash in a retractable handheld housing.

It is another object of the invention to provide an illuminated, retractable leash having a leash housing at least partially made of transparent plastic, whereby the housing itself is illuminated by virtue of the spool of EL-wire, thereby increasing the safety of the user when walking his or her pet at night.

It is a further object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Figure 1:
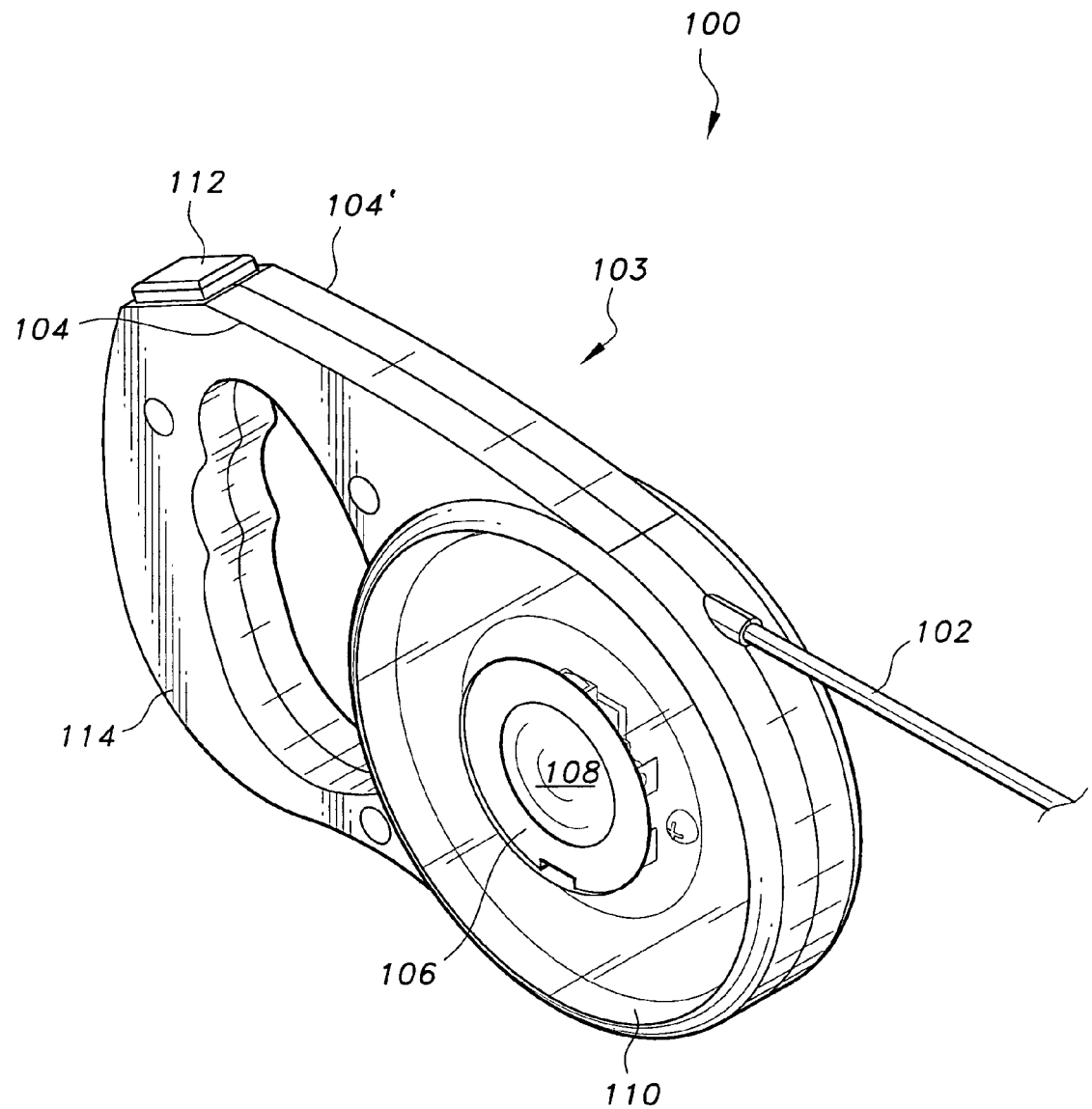
FIG. 1 is a perspective view of a first embodiment of an illuminated retractable leash according to the present invention.

The present invention is an illuminated retractable leash, designated generally as 100 in the drawings. The retractable leash material consists of electroluminescent wire (EL-wire), which illuminates when supplied with an operative voltage supplied by a DC to AC inverter disposed in the leash housing. When switched on, not only is the EL-wire visible as it extends from the housing, but by virtue of the EL-wire wound on the transparent spool, the glow from the EL-wire is visible through the transparent housing.

Referring first to FIG. 1, a first embodiment of the illuminated retractable leash 100 comprises an at least partially transparent plastic housing 103 having two halves 104, 104', a grip portion 114, a stop mechanism trigger 112, a battery cover 106 that snaps into the center of housing half 104, and a length of electroluminescent wire 102 extending from housing 104. At least one portion 110 of each housing half 104, 104' is transparent to allow light generated from within the housing 103 to be visible from the exterior of the retractable leash 100. The free end of the electroluminescent wire 102 is equipped with a snap hook or other connector adapted for attachment to a pet collar.

Figure 2:
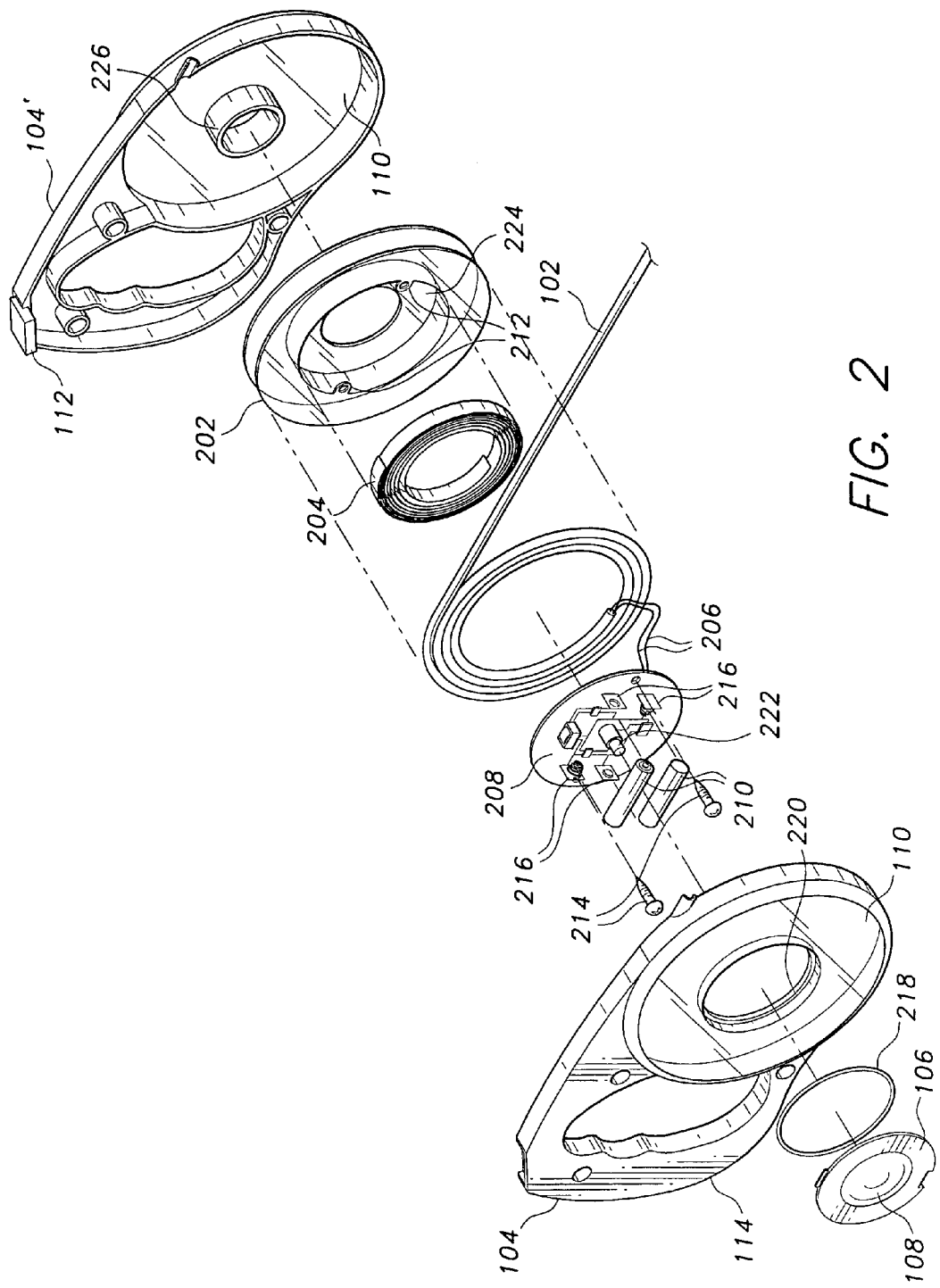
FIG. 2 is an exploded, perspective view of the illuminated retractable leash according to FIG. 1.
Figure 3:
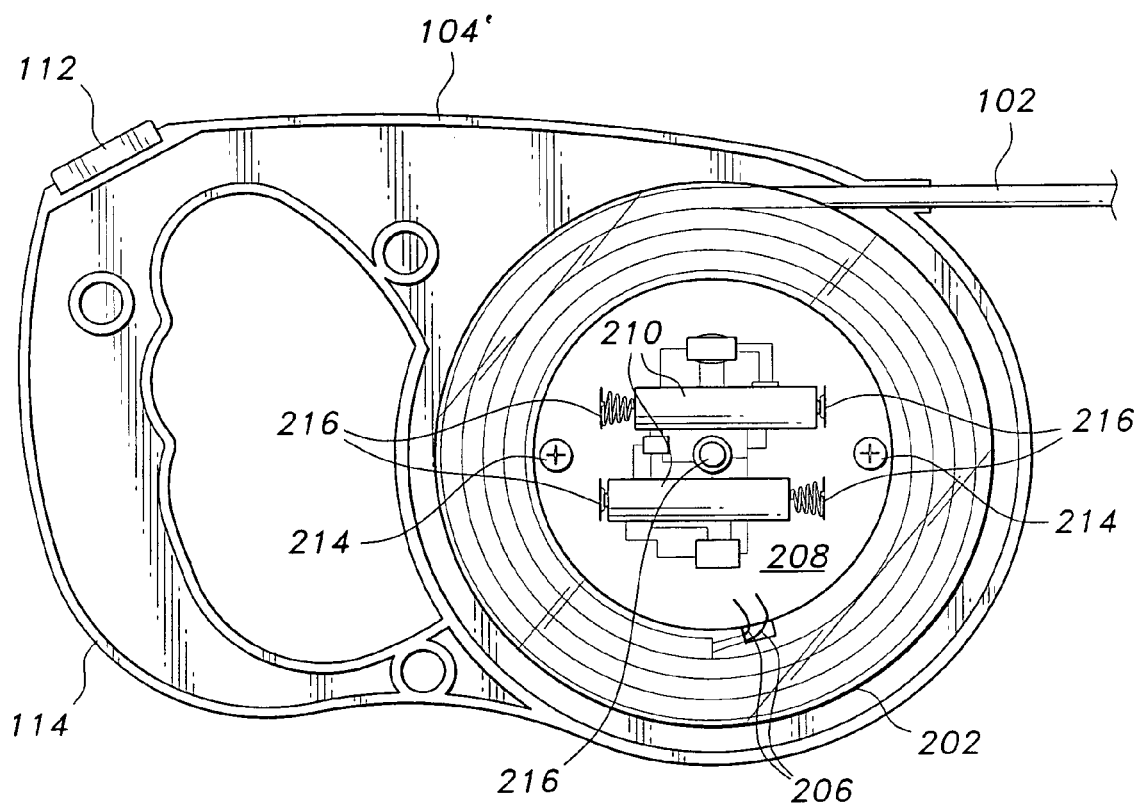
FIG. 3 is a side view of the illuminated retractable leash according to FIG. 1 with half of the housing removed to show the interior of the housing.

Leash retractor mechanisms are well known, and a mechanism similar to that disclosed in U.S. Patent Application Publication No. 2003/0029388, published in February 2003, and U.S. Patent Application Publication No. 2003/0145803, published in August 2003, the disclosure of which is hereby incorporated by reference, may be utilized to provide for extension and retraction of the electroluminescent wire 102 in the leash 100 of the present invention. As shown in FIGS. 2–3, the illuminated retractable leash 100 includes a coiled spring 204 biasing a spool 202 formed of transparent plastic, around which a length of EL-wire 102 is wound. The spring 204 is received within a cavity 224 in the lateral surface of spool 202, the inner end of the spring 204 being fastened to a non-rotating portion of the housing 103, and the outer end of the spring being fastened to the rotating spool 202. When the EL-wire 102 is played out, the spool 202 rotates, increasing spring tension, whereby any slack generated in the EL-wire 102 is automatically rewound on the spool 202. A stop mechanism, not shown but disclosed in both the incorporated '388 and '803 Patent Application Publications, is activated by a grip mounted button 112, and serves to stop the extension or winding up of the EL-wire 102 about spool 202.

The snap-fitting circular battery compartment cover 106, formed of molded plastic, provides a snug fit within an opening in housing half 104. Cover 106 provides access to a printed circuit board 208 mounted to the center of spool 202 by a pair of screws 214 received by a pair of bosses 212 defined within the lateral side of the spool 202. The periphery of the battery cover 106, substantially thicker than the central portion 108 of the cover, has plastic tabs disposed thereon, allowing the cover 106 to snap securely in place. A rubber gasket 218, or other waterproofing seal, placed within a recess 220 defined within the outer perimeter of an opening in the housing-half 104 provides a waterproof seal protecting the printed circuit board 208 disposed within.

With the battery cover 106 removed, a pair of batteries 210 is removably retained within battery clips 216 mounted on printed circuit board 208. The printed circuit board 208, mounted to the center of spool 202 by screws 214, contains a DC to AC inverter circuit not uncommon in the field of electronics and is powered by the board mounted batteries 210. The batteries 210, as well as the other components deposed on the printed circuit board 208, are uniformly distributed by weight about the center of the printed circuit board 208 in order to enable the spool 202 to rotate evenly about its axis when mounted on spool hub or support 226.

A miniature push button switch 222, mounted in the center of the printed circuit board 208, operates to supply an effective voltage to the DC to AC inverter circuit. The abutment portion of switch 222 is in contact with the interior surface of the thin center portion 108 of the battery cover 106, whereby depressing the center 108 of the exterior portion of the battery cover 106 operates to illuminate or extinguish the glow from the EL-wire 102.

Figure 4:
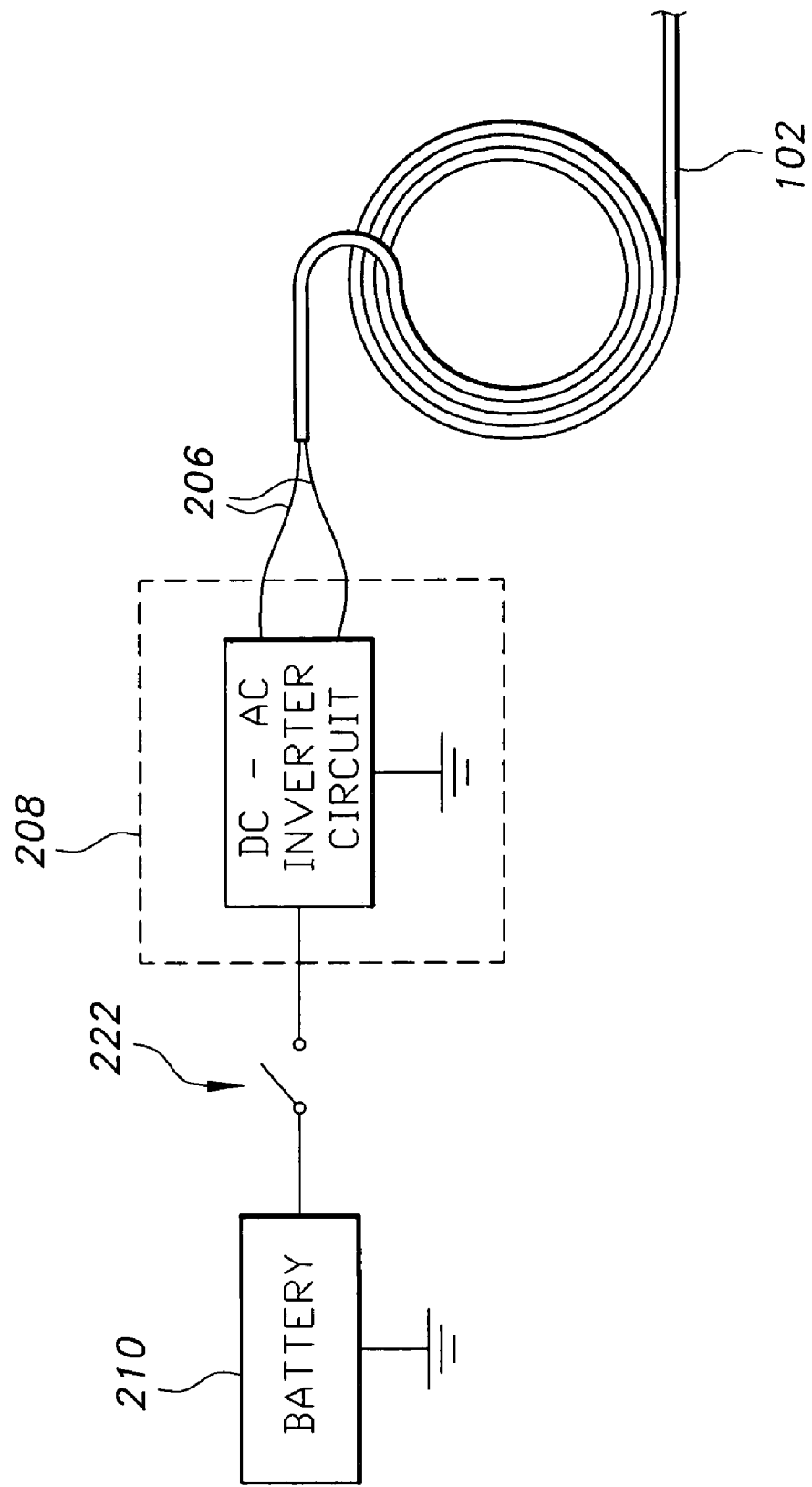
FIG. 4 is a representative block diagram of the illuminated retractable leash according to FIG. 1.

FIG. 4 shows a representative block diagram of the electrical circuit for the illuminated retractable leash 100 and shows at least one battery 210 supplying a DC voltage to the inverter circuit mounted on printed circuit board 208 through switch 222. The ends 206 of the EL-wire are soldered, or otherwise connected, to the output of the inverter.

FIGS. 5–8 illustrate an alternate embodiment of the illuminated retractable leash 100, which removes the added mass of the printed circuit board and batteries from the rotating spool, thereby directing the full force of the spring towards retracting the EL-wire. As with the embodiment of FIGS. 1–4, the illuminated retractable leash of FIGS. 5–8 contains a leash housing 502 having two halves 504 and 504', transparent housing portions 506 in each half, a leash retractor mechanism including a stop mechanism and trigger 112, and a spool biasing spring 204 disposed within a recess 616 in the right lateral side 618 of transparent spool 606. However, in this second embodiment, a screw 610 or other suitable hardware secures the printed circuit board 608 to a non-rotating portion of the housing 504'. Furthermore, the "on/off" switch 508 and batteries 604 are disposed in the handgrip 514, the batteries 610 being accessible by removing battery cover 512. Similar to the previous embodiment a rubber gasket 602 or other waterproofing seal protects the printed circuit board 608 mounted inverter circuit from water damage.

Figure 5:
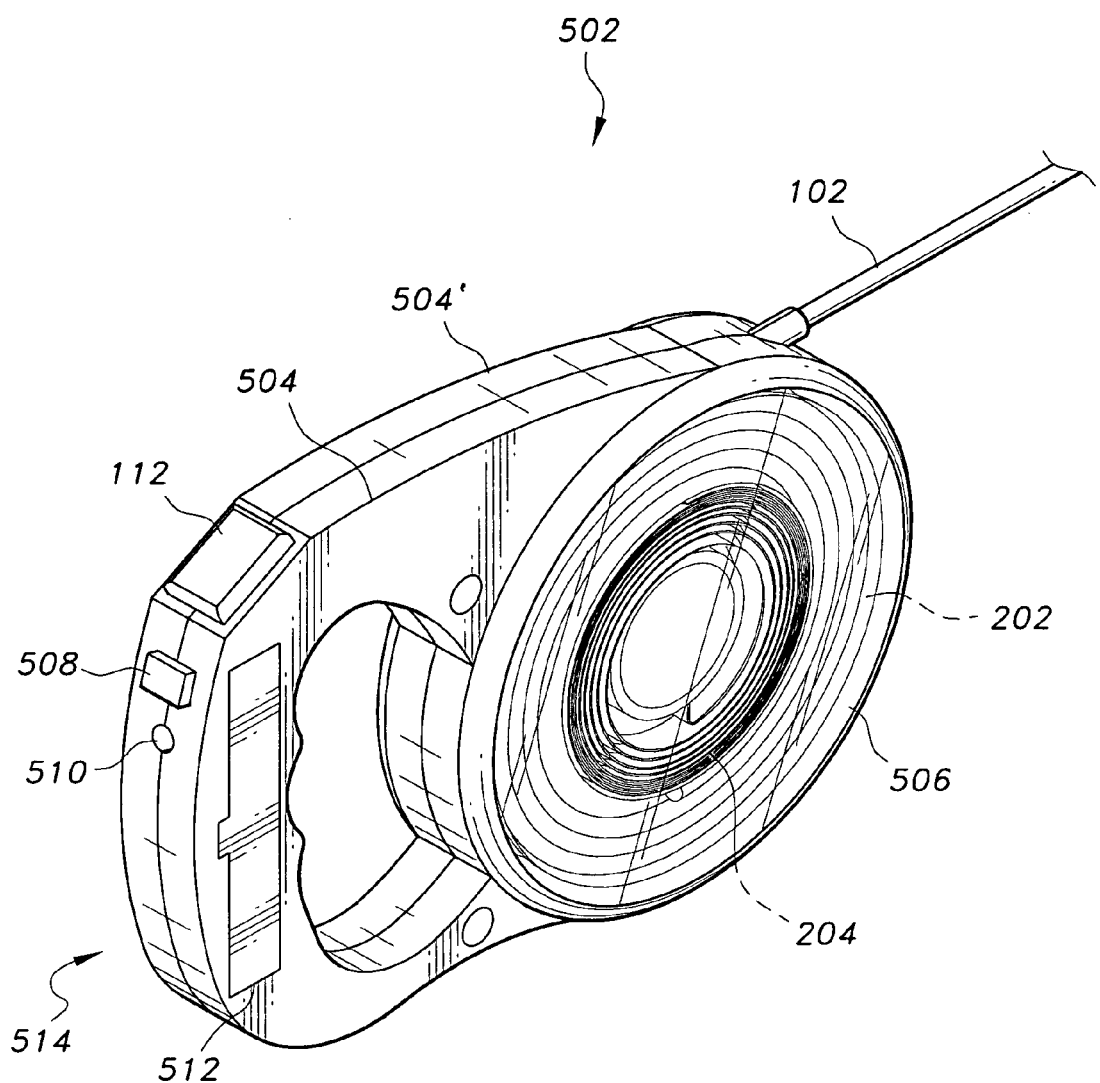
FIG. 5 is a perspective view of an alternate embodiment of an illuminated retractable leash according to the present invention having the battery compartment in the handle grip and the inverter circuit mounted in the leash housing.
Figure 6:
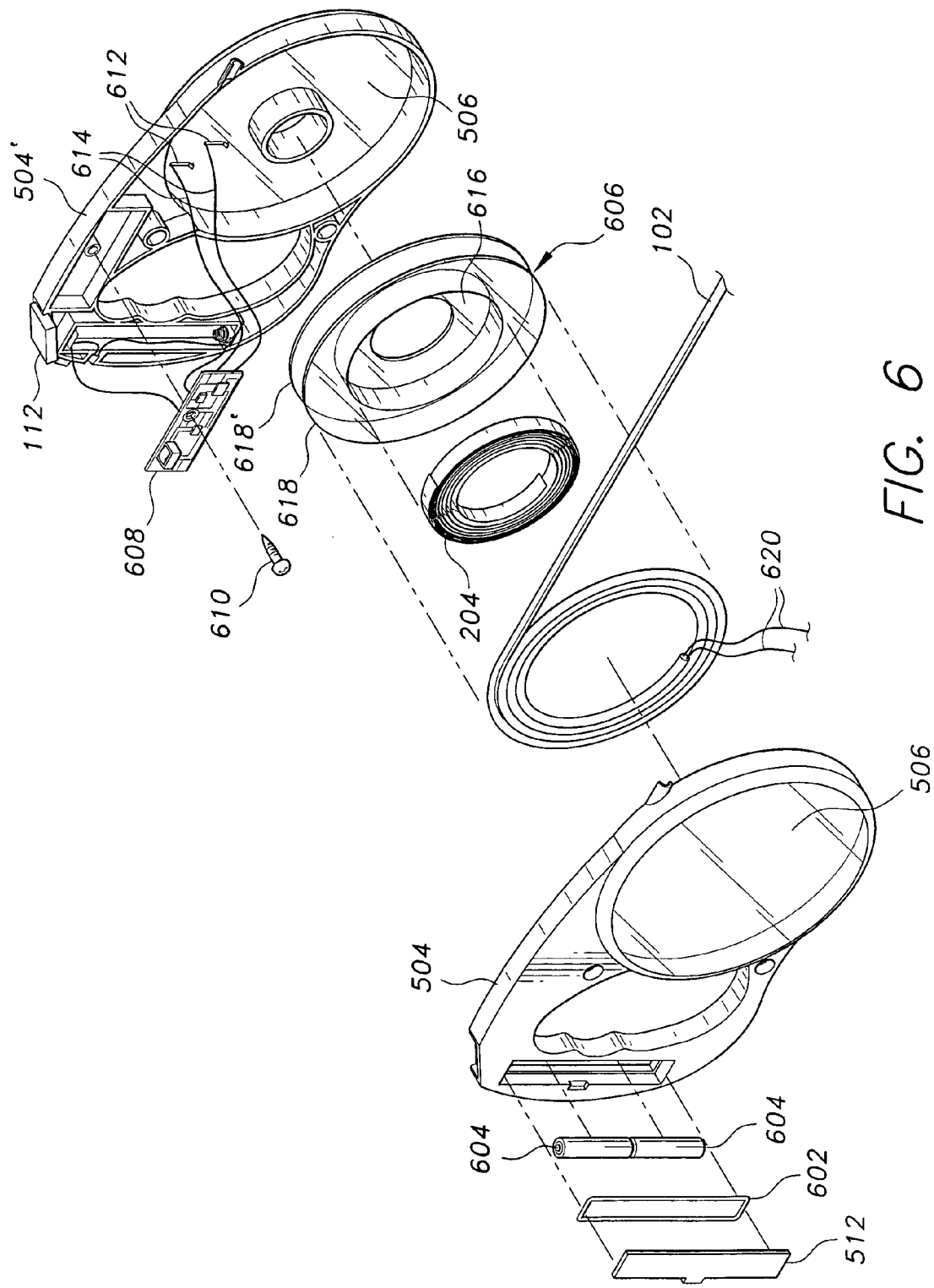
FIG. 6 is an exploded, perspective view of the illuminated retractable leash according to FIG. 5.
Figure 7:
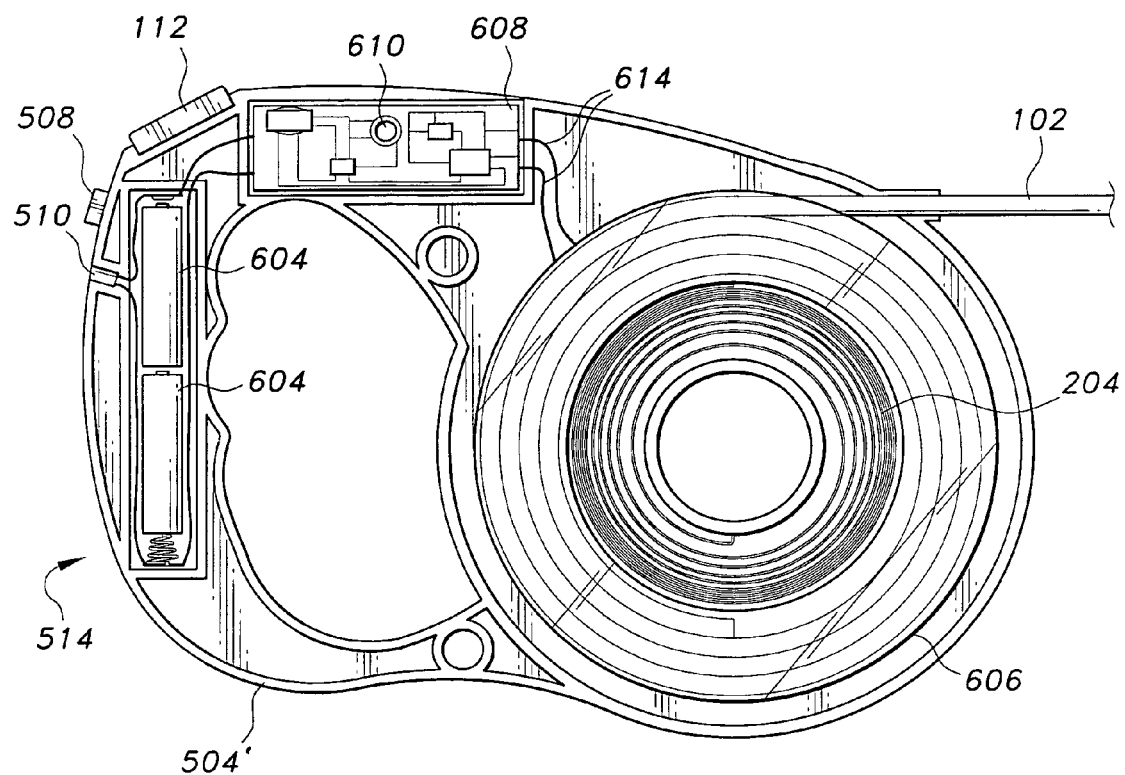
FIG. 7 is a side view of the illuminated retractable leash according to FIG. 5 with half of the housing removed to show the interior of the housing.

Although the heretofore-mentioned embodiments have been silent as to the type of battery used to supply the power for the inverter circuit, the present invention is not limited to a specific battery technology. Lead acid, nickel-cadmium or Lithium ion batteries may be incorporated as seen fit. Should rechargeable batteries be employed, a grip mounted external DC jack 510 as shown in FIGS. 5 and 7 is provided to recharge the batteries.

Figure 8:
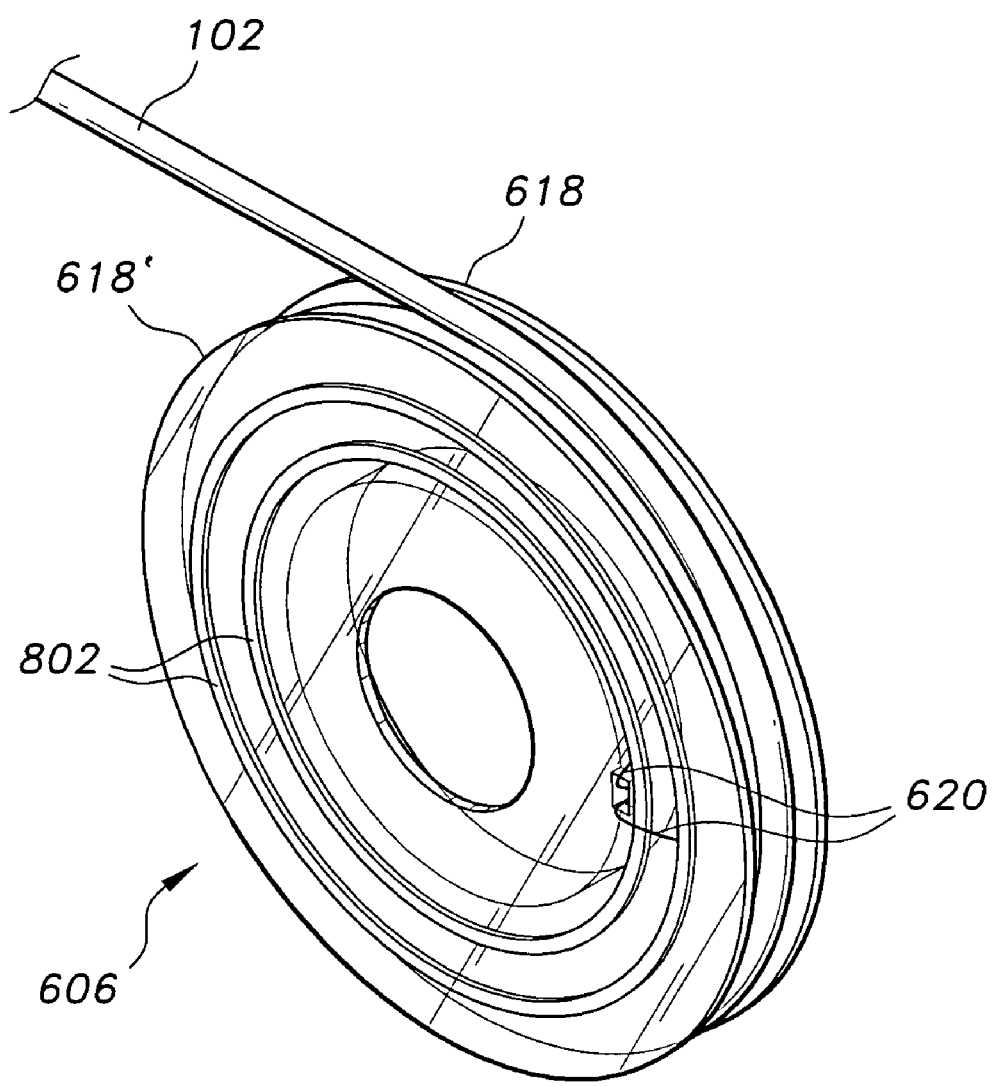
FIG. 8 is a perspective view of the wire spool of the leash of FIG. 5, illustrating the conductive rings defined on the lateral surface of the spool.

In positioning the inverter circuit and battery outside of the spool 606, the difficulty to be overcome is how to deliver inverter output to the rotating ends 620 of the EL-wire 102 wound on spool 606. This problem is solved by a pair of electrical contacts 612 mounted to the inner lateral surface 506 of housing 504', connected by a pair of wires 614 to the inverter circuit on the printed circuit board 608. As best seen in FIG. 8, the inner ends 620 of the EL-wire 102 are soldered, or otherwise electrically connected to a pair of concentric electrically conductive surfaces 802 defined in the left lateral side 618' of the rotating spool 606. The housing mounted contactors 612 are so aligned to make continuous contact with the rotating conductive plates 802, thereby providing a continuous supply of alternating current to illuminate the EL-wire 102.

In conclusion, the inventor has disclosed two embodiments of an illuminated retractable leash 100, in which electroluminescent wire, serving as the leash material, illuminates both the housing and the extended leash.

It is to be understood that the present invention is not limited to the embodiments described above, but encompasses any and all embodiments within the scope of the following claims.

What is claimed is:

1. An illuminated retractable leash comprising;
   a housing;
   a spring-biased spool rotatably supported in said housing;
   an extendible roll of electroluminescent wire wound around said spool, the wire having a free end adapted for attachment to a pet collar;
   a stop mechanism for engaging said spool and for blocking the extension or winding up of the electroluminescent wire about said spool;
   a printed circuit board centrally mounted to a lateral surface of said spool, whereby said printed circuit board rotates in conjunction with said spool;
   a battery holder mounted to said printed circuit board; and
   a DC to AC inverter having an electric output for providing an electric excitation, the electric output thereof selectively connected to an end of the electro-luminescent wire;
   wherein upon electric excitation at the electric output to said electroluminescent wire, said electroluminescent wire is illuminated along the entire length thereof.

2. The illuminated retractable leash according to claim 1, wherein said battery holder has electrical leads selectively supplying power to said inverter.

3. The illuminated retractable leash according to claim 1, wherein said spool and at least part of said housing is transparent.

4. An illuminated retractable leash comprising;
   a housing having a grip portion;
   a spring-biased spool rotatably supported in said housing, said spool having a pair of electrically conducting surfaces concentrically disposed on a lateral surface of said spool;
   an extendible roll of electroluminescent wire wound around said spool, said electroluminescent wire having at least two conductors, said conductors electrically connected to said pair of concentrically disposed conducting surfaces, said wire further having a free end adapted for attachment to a pet collar;
   a retractor mechanism whereby slack section of said wire can be taken up automatically by said spring-biased spool when the maximum extension length of said wire is not being used;
   a pair of electric contacts mounted to said housing and positioned to make continuous electric contact with said pair of concentrically disposed conducting surfaces as the spool rotates;
   a printed circuit board disposed in said housing, said printed circuit board having a DC to AC power inverter, the electric output thereof connected to said pair of housing mounted electric contacts; and
   a battery holder disposed in said housing, said battery holder having electrical leads selectively supplying power to said inverter.

5. The illuminated retractable leash according to claim 4, wherein said spool is transparent and at least part of said housing is transparent.

* * * * *